(12) United States Patent
Zhang

(10) Patent No.: US 11,150,619 B2
(45) Date of Patent: Oct. 19, 2021

(54) INTELLIGENT LIGHTING CONTROL SYSTEM BASED ON INTERNET OF THINGS

(71) Applicants: Self Electronics Co., Ltd., Zhejiang (CN); Wanjiong Lin, Zhejiang (CN); Self electronics USA Corporation, Norcross, GA (US)

(72) Inventor: Jian Zhang, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 106 days.

(21) Appl. No.: 16/691,263

(22) Filed: Nov. 21, 2019

(65) Prior Publication Data

US 2020/0166903 A1    May 28, 2020

(30) Foreign Application Priority Data

Nov. 28, 2018   (CN) .......................... 201811433479.2

(51) Int. Cl.
| | | |
|---|---|---|
| *H04L 12/28* | (2006.01) | |
| *G05B 19/042* | (2006.01) | |
| *H04L 12/40* | (2006.01) | |
| *H04L 12/66* | (2006.01) | |
| *H04L 29/12* | (2006.01) | |
| *H04L 29/08* | (2006.01) | |
| *H04W 84/12* | (2009.01) | |

(52) U.S. Cl.
CPC ...... *G05B 19/042* (2013.01); *H04L 12/40013* (2013.01); *H04L 12/66* (2013.01); *H04L 61/6022* (2013.01); *H04L 67/10* (2013.01); *H04L 67/12* (2013.01); *G05B 2219/23154* (2013.01); *H04L 2012/40208* (2013.01); *H04W 84/12* (2013.01)

(58) Field of Classification Search
CPC ........... H04L 12/40078; H04L 12/6418; H04L 12/40117; H04L 12/403; H04L 29/06
See application file for complete search history.

(56) References Cited

U.S. PATENT DOCUMENTS

| | | | | |
|---|---|---|---|---|
| 9,686,842 | B1 * | 6/2017 | Coombes | ............... H05B 47/18 |
| 9,860,677 | B1 * | 1/2018 | Agerstam | ............... H04W 4/70 |
| 10,791,607 | B1 * | 9/2020 | Modestine | ........... H05B 47/175 |
| 2012/0212140 | A1 * | 8/2012 | Kim | ....................... H05B 45/30 |
| | | | | 315/151 |
| 2015/0130368 | A1 * | 5/2015 | Harbers | ................. H05B 45/10 |
| | | | | 315/291 |
| 2016/0360594 | A1 * | 12/2016 | Chemel | ................. H05B 47/115 |
| 2017/0093593 | A1 * | 3/2017 | Yang | ....................... H04W 4/70 |

(Continued)

*Primary Examiner* — Phuongchau Ba Nguyen

(74) *Attorney, Agent, or Firm* — Wang Law Firm, Inc.

(57) ABSTRACT

The invention discloses an intelligent lighting control system based on Internet of Things, comprising a gateway, a cloud server a plurality of DALI systems, each DALI system includes a DALI bus 100 connected to the gateway, and each DALI bus is provided with a power node, a plurality of execution nodes, a plurality of control nodes and a plurality of sensor nodes, and the number of execution nodes on each DALI bus ranges from 1 to 64; the intelligent terminal can perform data interaction with any one of the nodes in any DALI system under the gateway. In the present invention, a single gateway can provide up to 256 execution nodes, which can be applied to construct a large and complex lighting control system.

8 Claims, 3 Drawing Sheets

(56) References Cited

U.S. PATENT DOCUMENTS

| | | |
|---|---|---|
| 2017/0094018 A1* | 3/2017 | Ekstrom .................. H04L 67/10 |
| 2017/0155703 A1* | 6/2017 | Hao ........................ H04L 67/12 |
| 2017/0257257 A1* | 9/2017 | Dawes .................. G06F 16/954 |
| 2018/0138945 A1* | 5/2018 | Kearney ............. H04L 25/4902 |
| 2018/0310389 A1* | 10/2018 | Recker ...................... H02J 9/02 |
| 2019/0347916 A1* | 11/2019 | Wild ................... H04L 67/2823 |
| 2021/0157312 A1* | 5/2021 | Celia .................. G05B 23/0291 |

* cited by examiner

INTELLIGENT LIGHTING CONTROL SYSTEM BASED ON INTERNET OF THINGS

RELATED APPLICATION

This application claims priority to a Chinese Patent Application No. CN 201811433479.2, filed on Nov. 28, 2018.

FIELD OF THE TECHNOLOGY

The present invention relates to the technical field of lighting control, with particular emphasis on a Intelligent lighting control system based on internet of things.

BACKGROUND OF THE INVENTION

The existing lighting control system generally adopts DALI, a communication digital addressable interface bus protocol specially used for lighting control. However, DALI protocol has the following shortcomings in its application:

(1) The capacity of a single network is small and the maximum number of nodes in a system's single network based on DALI is only 64, which means that a maximum of 64 device interfaces can be provided on a single network. Obviously, it is not appropriate to build large and complex lighting control system only by using DALI protocol.

(2) The debugging is cumbersome. Because each unit in the DALI system has an independent address, so the lighting debugging work is cumbersome.

BRIEF SUMMARY OF THE INVENTION

In view of this, it is necessary to provide an intelligent lighting control system based on the Internet of Things to overcome the shortcomings above.

An intelligent lighting control system based on Internet of Things, comprising:
  a gateway;
  a plurality of DALI systems, each DALI system includes a DALI bus 100 connected to the gateway, and each DALI bus is provided with a power node, a plurality of execution nodes, a plurality of control nodes and a plurality of sensor nodes, and the number of execution nodes on each DALI bus ranges from 1 to 64;
  a cloud server connected to the gateway;
  a plurality of intelligent terminals for connecting to the cloud server, the intelligent terminal can perform data interaction with any one of the nodes in any DALI system under the gateway.

Advantageously, it further comprising a management platform connected to a cloud server for information input and information storage.

Advantageously, there are two intelligent terminals, which are respectively first and second intelligent terminal, first intelligent terminal is configured to map each execution node under the gateway to a layout made according to the actual position of each lamp, and the second intelligent terminal is configured to perform timing setting on any node under the gateway.

Advantageously, each of the first intelligent terminal and the second intelligent terminal can group each execution node under the gateway and can also perform function configuration on each control node under the gateway, the lamps in a group can all be lamps in the same DALI system or include lamps in different DALI systems, and each control node can be configured to control any group and realize any control function.

Advantageously, the process by which the first intelligent terminal maps each execution node under the gateway to a layout map made according to the actual position of each lamp is as follows:
  S1: According to the actual position of each lamp to make the layout diagram of lamps;
  S2: selecting a lamp and making the status of the lamp different from other lamps, determining the corresponding position of the lamp in the layout diagram by observing the actual position of the lamp, and then selecting the corresponding position of the lamp in the layout diagram and establishing a corresponding relationship between the lamp and the corresponding position in the layout diagram;
  S3: all the remaining lamps are operated in accordance with S2 method one by one to establish a corresponding relationship between each lamp and its corresponding position in the layout diagram.

Advantageously, the process of establishing a corresponding relationship between the lamps and corresponding positions in the layout diagram is as follows:
  obtaining the DALI address of each lamp, and after selecting a lamp, obtaining the DALI address of the selected lamp;
  establishing a coordinate system in the layout diagram, and obtaining coordinate values of the selected corresponding position after selecting a corresponding position of the lamp in the layout diagram;
  establishing a corresponding relationship between the DALI address of the selected lamp and the coordinate value of the corresponding position of the lamp in the layout diagram.

Advantageously, the gateway has a built-in WIFI module and an Ethernet module, and MAC addresses of WIFI module and Ethernet module are synchronized according to the following process:
  the smart device obtains the MAC address of the WIFI module;
  the smart device sends the obtained MAC address to the control module through the WIFI module;
  the control module writes the received MAC address to the Ethernet module.

Advantageously, the following steps are also included before the smart device acquires the MAC address of the WIFI module:
  connect the smart device to the specified network;
  the control module enters a MAC address synchronization mode, and the control module sends an instruction to the WIFI module to make the WIFI module enter a state that can be found by the smart device;
  after the smart device finds the WIFI module, it sends the information of the specified network to the WIFI module, and then the WIFI module connects to the specified network;
  the smart device searches for the WIFI module, and the smart device acquires the MAC address of the WIFI module after the smart device searches for the WIFI module.

Advantageously, the control module is connected to an alarm module, and it also includes the step of verifying the MAC address written to the Ethernet after the control module writes the MAC address obtained to the Ethernet module.

Advantageously, the step of verifying the MAC address written to the Ethernet module comprises:
  the control module reads the MAC address of the Ethernet module;
  determine whether the MAC address read by the control module from the Ethernet module is the same as the MAC address written by the control module to the Ethernet module, if yes, the control module sends the MAC address synchronization success information to the smart device through the WIFI module, and the control module exits the MAC address synchronization mode; if not, the control module rewrites the MAC address to the Ethernet module and increments the number of MAC address writes of the Ethernet module by 1, and then the control module reads the MAC address of the Ethernet module, and then determine whether the MAC address read by the control module from the Ethernet module is the same as the MAC address written to the Ethernet module, and then performs the same operation according to the above method according to the judgment result, if the MAC address read by the control module from the Ethernet module is still different from the MAC address written by the control module to the Ethernet module after the control module has written the MAC address to the Ethernet module for several times, the control module sends commands to the alarm module, and the alarm module gives alarm.

Compared with the prior art, each gateway in the present invention can connect up to four DALI buses, and each DALI bus can set up to 64 execution nodes, that is, a single gateway can provide up to 256 execution nodes, which can be suitable for building large and complex lighting control systems. Meanwhile, because each DALI bus is connected to the gateway, the DALI buses can communicate with each other and the communication signals do not need to pass through the cloud server, so that any control node on the DALI bus can be set to control any execution node under the gateway so as to realize cross-bus control which can be realized under the gateway without passing through the cloud server.

BRIEF DESCRIPTION OF THE DRAWINGS

The drawings described herein are intended to promote a further understanding of the present invention, as follows.

DETAILED DESCRIPTION OF THE INVENTION

The present application is illustrated by way of the following detailed description based on of the accompanying drawings. It should be noted that illustration to the embodiment in this application is not intended to limit the invention.

Figure 1:
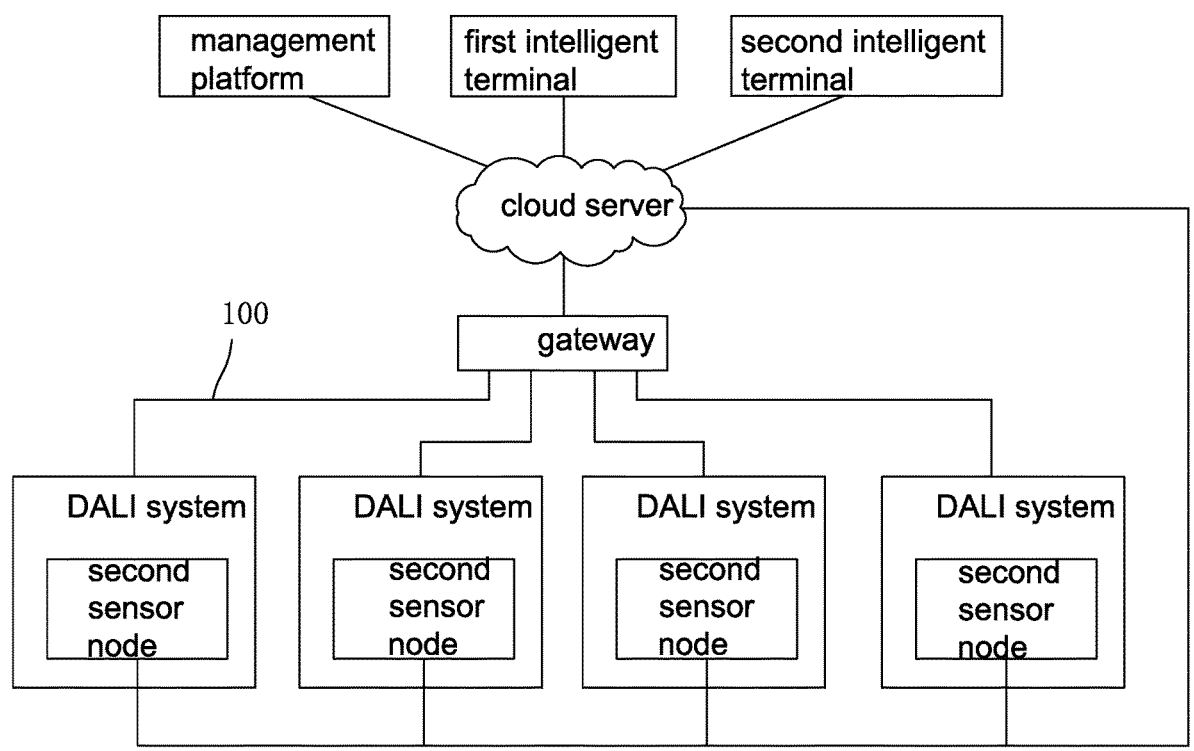
FIG. 1 is a schematic diagram of the circuit structure of the present invention.
Figure 2:
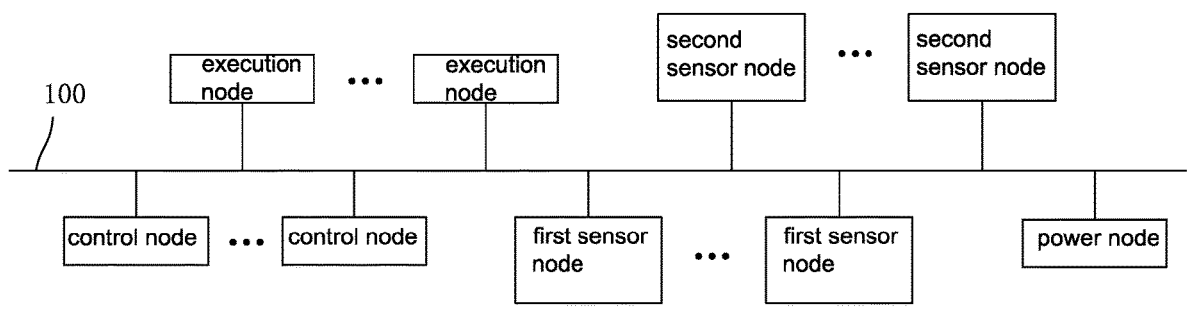
FIG. 2 is a schematic diagram of the circuit structure of the DALI system.

As shown in FIG. 1 and FIG. 2, the intelligent lighting control system based on the Internet of Things in the present invention comprises a gateway, a plurality of DALI systems, a cloud server connected to the gateway, a plurality of intelligent terminals for connecting to the cloud server and a management platform connected to the cloud server.

Each DALI system comprises a DALI bus 100 connected to the gateway and each DALI bus is provided with a power node, a plurality of execution nodes, a plurality of control nodes and a plurality of first sensor nodes, and a plurality of second sensor nodes. The number of execution nodes on each DALI bus ranges from 1 to 64, which means that there can be up to 256 execution nodes under a single gateway.

The power node is LED driving power supply, the execution node is LED lamp, the control node is control panel, the first sensor node is photosensitive sensor, human proximity sensor, infrared sensor, etc., and the second sensor node is temperature sensor, humidity sensor, WIFI probe, illumination sensor, etc. In addition to data transmission through the DALI bus, the second sensor node on each DALI bus is directly connected to the cloud server, so that the detection data of the second sensor node can be directly sent to the cloud server to facilitate the cloud server to realize a specific control function after performing analysis operations based on the detection data of the second sensor node.

The intelligent terminal can perform data interaction with any node in any DALI system under the gateway, that is, the intelligent terminal can perform program setting and command manipulation on any node under the gateway.

The management platform is used for information input and information storage. The picture information and the user account information of lamps, and the like can be input through the management platform.

There are two intelligent terminals, which are respectively the first and the second intelligent terminal. The first intelligent terminal is configured to map each execution node under the gateway to a layout made according to the actual position of each lamp, that is to say, to map each lamp controlled under the gateway to a layout made according to the actual position of each lamp. The second intelligent terminal is configured to set timing for any node under the gateway, so that the LED driving power source, LED lamp, and various sensors can be turned on or off as needed.

The first intelligent terminal and the second intelligent terminal can group each execution node under the gateway, that is, all the LED lamps under the gateway can be grouped by the first intelligent terminal or the second intelligent terminal, and the first intelligent terminal and the second intelligent terminal can also perform function configuration on each control node under the gateway. The control node is a control panel, and the control panel is provided with a plurality of buttons, so that the first and the second intelligent terminal can perform function configuration for each button on the control panel.

When the lamps under the gateway are grouped by the first intelligent terminal or the second intelligent terminal, the lamps in one group can all be lamps in the same DALI system or include lamps in different DALI systems. Thus, when the lamps in each group contain lamps in different DALI system, cross-bus control is realized. Any button on each control panel can be configured to control any group and realize any control function.

The grouping of the lamps under the gateway and the function configuration of the buttons on the control panel can be realized through the human-computer interaction interface on the intelligent terminal, and the grouping and function configuration are conventional technologies in the field, which will not be specifically described herein.

The first sensor node on the DALI bus has two working modes, a stand-alone mode and a system mode. In stand-alone mode, the first sensor node is powered by the LED driving power supply on the DALI bus to which it is connected. In system mode, since all DALI buses are connected to the gateway, the first sensor node can be powered without using the LED driving power supply under its own gateway, and the first sensor node can be powered by the LED driving power supply on other DALI buses under the gateway, so that the LED driving power supply on the DALI bus, where the first sensor node is located, can be cut off, that is, in system mode, the LED driving power supply on a DALI bus can supply power to the first sensor node on all DALI buses under the gateway, which eliminates the need to turn on the LED driving power supply on each DALI bus, reducing power consumption.

Because the lamp is controlled by DALI protocol through a gateway supporting DALI protocol in the present invention, the first step is to scan all the lamps under DALI gateway. According to the DALI protocol, each lamp will have a DALI address in DALI protocol. Different lamp can be identified by different DALI address. The lamps can be scanned through the human-computer interaction interface on the first intelligent terminal, so that after we scan each lamp, when we select a lamp, we can get the DALI address of the lamp selected.

The process by which the first intelligent terminal maps each lamp under the gateway to a layout made according to the actual position of each lamp is as follows:

S1: According to the actual position of each lamp, the layout of the lamp is made. The actual position of the lamp is the position of the lamp in reality. If the lamp is set in a room, we observe the whole room from the perspective of overlooking, make the layout of all the lamps observed and establish the coordinate system in the layout, where we usually use the top left corner of the layout as the origin, the downward as the Y axis and the right as the X axis to establish the coordinate system. The layout can be made through the human-computer interaction interface on the first intelligent terminal, and the layout completed can be uploaded to the cloud server for storage.

S2: Select a lamp by operating the buttons on the control panel in the room to make the lamp flash, so that we can easily observe the actual position of the lamp in the room. By observing the actual position of the lamp, we can determine the corresponding position of the lamp in the layout. Because the position distribution of the lamp in the layout is exactly the same as the actual position distribution of the lamp in the room, as long as we know the actual position of the lamp in the room, we can get the corresponding position of the lamp in the layout, and then select the corresponding position of the lamp in the layout. Since the coordinate system is established in the layout, we can obtain the coordinate value (X, Y) of the corresponding position after selecting the corresponding position of the lamp in the layout, and then establish corresponding relationship between the DALI address of the lamp and the coordinate value (X, Y) of the corresponding position of the lamp in the layout diagram, that is, as long as we select the lamp in the layout, we also select the corresponding lamp in reality.

S3: All the other lamps are operated by the first intelligent terminal in accordance with the method of S2, so as to establish a corresponding relationship between the DALI address of each lamp and the coordinate value (X,Y) of the corresponding position of the lamp in the layout. After the corresponding relationship is established, the data is uploaded to the cloud server for storage. In this way, when we perform operations such as grouping, setting, and controlling the lamp through the first intelligent terminal or the second intelligent terminal, we first download the layout and corresponding relationship stored in the cloud server through the first intelligent terminal or the second intelligent terminal (the corresponding relationship between the DALI address of each lamp and the coordinate value of the corresponding position of the lamp in the layout), and then select the required lamp in the layout through the first intelligent terminal or the second intelligent terminal to obtain the DALI address of the selected lamp so as to select the corresponding lamp in reality. Therefore, we can select the lamp through the layout very intuitively. It is not necessary to select the lamp by remembering the name, which makes the selection of the lamp more convenient.

Figure 3:
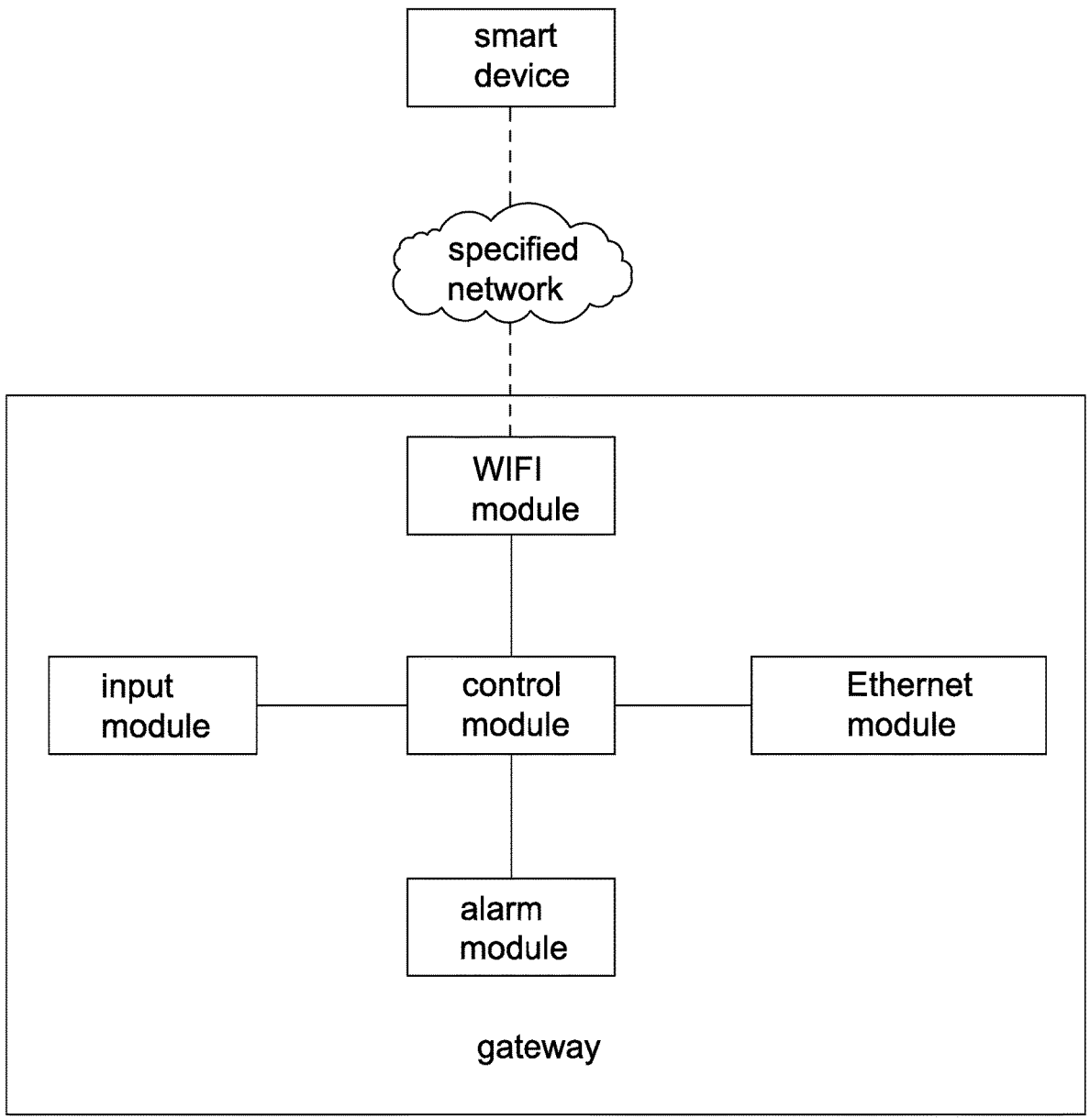
FIG. 3 is a structure diagram of the gateway.

As shown in FIG. 3, the gateway in the present invention includes control module, WIFI module, Ethernet module, input module, and alarm module. The WIFI module, Ethernet module, input module and alarm module are all electrically connected with the control module. The main control chip of the gateway contains the control module described above; the input module is any device that can send signals to the control module by human operation. In this embodiment, the input module is a button. Of course, the input module can also be a sound sensor, an infrared sensor, a touch sensor, etc.; the WIFI module is used for gateway to connect WIFI network, and Ethernet module is used for gateway to connect Ethernet; the alarm module can be buzzer, acousto-optic alarm and other alarm devices.

The intelligent device is a smart phone or a computer, in which an application for implementing the control functions required in this embodiment is installed.

In this embodiment, a method for synchronizing the MAC address of the WIFI module and the Ethernet module on the gateway is disclosed, which includes the following steps:

S1: Connect the smart device to the specified network which can be any local area network (LAN).

S2: By operating the input module, the input module sends instructions to the control module. When the input module is a button, press the button to send an instruction to the control module. When the input module is the above mentioned sound sensor, infrared sensor, touch sensor and other sensors, the sensor is triggered to make it to send an instruction to the control module. The instruction makes the control module to enter the synchronization mode of MAC address. After the control module enters the synchronization mode of MAC address, the control module sends an instruction to the WIFI module to make the WIFI module to enter a state that can be discovered by the intelligent device. After the WIFI module enters the state that can be discovered by the intelligent device, even if the WIFI module is not in the same LAN as the intelligent device, the WIFI module can still be discovered by the intelligent device.

S3: After discovering the WIFI module, the intelligent device sends the information of the specified network to the WIFI module, where the information of the specified network includes the name and password of the network. After receiving the information of the specified network, the WIFI module connects to the specified network according to the information. After the WIFI module is connected to the specified network, the WIFI module and the intelligent device are in the same LAN, and the WIFI module and the intelligent device in the same LAN can transmit information to each other.

S4: The intelligent device searches for the WIFI module. Since the intelligent device and the WIFI module are in the same LAN, the intelligent device can search for the WIFI module. After the intelligent device searches for the WIFI module, the intelligent device obtains the MAC address of the WIFI module.

S5: The intelligent device sends the MAC address obtained in S4 to the control module through the WIFI module.

S6: The control module writes the received MAC address to the Ethernet module.

S7: The control module reads the MAC address of the Ethernet module.

S8: Determine whether the MAC address read by the control module from the Ethernet module is the same as the MAC address written by the control module to the Ethernet module, that is, whether the MAC address is successfully written by the Ethernet module through this step. If the MAC address read by the control module from the Ethernet module is the same as the MAC address written by the control module to the Ethernet module, it indicates that the MAC address of the Ethernet module is successfully written, and then S9 is performed; if the MAC address read by the control module from the Ethernet module is different from the MAC address written by the control module to the Ethernet module, it indicates that the MAC address of the Ethernet module is not successfully written, and then S10 is performed.

S9: The control module sends the information indicating the MAC address is successfully synchronized to the intelligent device through WIFI module, and the control module exits the synchronization mode of MAC address.

S10: Determine whether the number of MAC address writes of the Ethernet module reaches 3 times. If yes, perform S11, if not, perform S6, that is, the control module rewrites the MAC address received in S4 to the Ethernet module, and increases the number of MAC address writes of the Ethernet module by 1.

S11: The control module sends a command to the alarm module, and the alarm module alarms to inform the operator that the hardware (such as the Ethernet module) in the intelligent host is damaged and cannot write the MAC address normally.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. An intelligent lighting control system based on Internet of Things, comprising:
    a gateway;
    a plurality of Digital Addressable Lighting Interface (DALI) systems, each DALI system includes a DALI bus connected to the gateway, and each DALI bus is provided with a power node, a plurality of execution nodes, a plurality of control nodes and a plurality of sensor nodes, and the number of execution nodes on each DALI bus ranges from 1 to 64;
    a cloud server connected to the gateway; and
    a plurality of intelligent terminals for connecting to the cloud server, the intelligent terminal can perform data interaction with any one of the nodes in any DALI system under the gateway;
    wherein,
    there are two intelligent terminals, which are respectively a first and a second intelligent terminal, the first intelligent terminal is configured to map each execution node under the gateway to a layout made according to the actual position of each lamp, and the second intelligent terminal is configured to perform timing setting on any node under the gateway, and
    wherein each of the first intelligent terminal and the second intelligent terminal can group each execution node under the gateway and can also perform function configuration on each control node under the gateway, the lamps in a group can all be lamps in the same DALI system or include lamps in different DALI systems, and each control node can be configured to control any group and realize any control function.

2. The intelligent lighting control system based on Internet of Things as claimed in claim 1, further comprising a management platform connected to a cloud server for information input and information storage.

3. The intelligent lighting control system based on Internet of Things as claimed in claim 1, wherein the process by which the first intelligent terminal maps each execution node under the gateway to a layout map made according to the actual position of each lamp is as follows:
    S1: According to the actual position of each lamp to make the layout diagram of lamps;
    S2: selecting a lamp and making the status of the lamp different from other lamps, determining the corresponding position of the lamp in the layout diagram by observing the actual position of the lamp, and then selecting the corresponding position of the lamp in the layout diagram and establishing a corresponding relationship between the lamp and the corresponding position in the layout diagram; and
    S3: all the remaining lamps are operated in accordance with S2 method one by one to establish a corresponding relationship between each lamp and its corresponding position in the layout diagram.

4. The intelligent lighting control system based on Internet of Things as claimed in claim 3, wherein the process of establishing a corresponding relationship between the lamps and corresponding positions in the layout diagram is as follows:
    obtaining the DALI address of each lamp, and after selecting a lamp, obtaining the DALI address of the selected lamp;
    establishing a coordinate system in the layout diagram, and obtaining coordinate values of the selected corresponding position after selecting a corresponding position of the lamp in the layout diagram; and
    establishing a corresponding relationship between the DALI address of the selected lamp and the coordinate value of the corresponding position of the lamp in the layout diagram.

5. The intelligent lighting control system based on Internet of Things as claimed in claim 1, wherein the gateway has a built-in WIFI module and an Ethernet module, and MAC addresses of WIFI module and Ethernet module are synchronized according to the following process:
    the smart device obtains the MAC address of the WIFI module;
    the smart device sends the obtained MAC address to the control module through the WIFI module; and
    the control module writes the received MAC address to the Ethernet module.

6. The intelligent lighting control system based on Internet of Things as claimed in claim 5, wherein the following steps are also included before the smart device acquires the MAC address of the WIFI module:
    connect the smart device to the specified network;
    the control module enters a MAC address synchronization mode, and the control module sends an instruction to the WIFI module to make the WIFI module enter a state that can be found by the smart device;
    after the smart device finds the WIFI module, it sends the information of the specified
    network to the WIFI module, and then the WIFI module connects to the specified network; and the smart device searches for the WIFI module, and the smart device acquires the MAC address of the WIFI module after the smart device searches for the WIFI module.

7. The intelligent lighting control system based on Internet of Things as claimed in claim 6, wherein the control module is connected to an alarm module, and it also includes the step of verifying the MAC address written to the Ethernet after the control module writes the MAC address obtained to the Ethernet module.

8. The intelligent lighting control system based on Internet of Things as claimed in claim 7, wherein the step of verifying the MAC address written to the Ethernet module comprises: the control module reads the MAC address of the Ethernet module;

determine whether the MAC address read by the control module from the Ethernet module is the same as the MAC address written by the control module to the Ethernet module, if yes, the control module sends the MAC address synchronization success information to the smart device through the WIFI module, and the control module exits the MAC address synchronization mode; and if not, the control module rewrites the MAC address to the Ethernet module and increments the number of MAC address writes of the Ethernet module by 1, and then the control module reads the MAC address of the Ethernet module, and then determine whether the MAC address read by the control module from the Ethernet module is the same as the MAC address written to the Ethernet module, and then performs the same operation according to the above method according to the judgment result, if the MAC address read by the control module from the Ethernet module is still different from the MAC address written by the control module to the Ethernet module after the control module has written the MAC address to the Ethernet module for several times, the control module sends commands to the alarm module, and the alarm module gives alarm.

* * * * *